United States Patent [19]

Rogers et al.

[11] Patent Number: 4,845,915
[45] Date of Patent: Jul. 11, 1989

[54] HIGH IMPACT PANEL CORNER

[75] Inventors: Orley D. Rogers, Farwell; Kenneth E. Staten, Clare, both of Mich.

[73] Assignee: Stageright Corporation, Clare, Mich.

[21] Appl. No.: 211,818

[22] Filed: Jun. 27, 1988

[51] Int. Cl.⁴ .............................................. E04C 2/38
[52] U.S. Cl. ..................................... 52/783; 52/830; 52/656; 52/127.5; 248/188; 108/156
[58] Field of Search ................. 52/783, 784, 656, 813, 52/829, 830, 127.5; 248/188 X; 108/156 X

[56] References Cited

U.S. PATENT DOCUMENTS

| 383,167 | 5/1888 | Brougher | 52/656 |
| 3,219,401 | 11/1965 | Mapson | 52/783 |
| 3,429,602 | 2/1969 | Dirilgen | 52/656 |
| 3,492,034 | 1/1970 | Skipp | 52/656 |
| 3,592,289 | 7/1971 | Aysta | 52/656 |
| 4,138,953 | 2/1979 | Tashman | 248/188 |
| 4,638,604 | 1/1987 | Rogers | 52/126.8 |

FOREIGN PATENT DOCUMENTS

| 2310109 | 12/1976 | France | 248/188 |
| 2036912 | 7/1980 | United Kingdom | 52/656 |

Primary Examiner—Henry E. Raduazo
Attorney, Agent, or Firm—Barnes, Kisselle, Raisch, Choate, Whittemore & Hulbert

[57] ABSTRACT

A structural load-bearing portable panel for staging, choral risers and the like having a high impact corner construction to resist the shock and dragging forces to which the corners are subjected when being assembled, disassembled, transported and stored. A molded or extruded corner element interfits with and is retained mechanically by the side edge pieces which have a recess to receive wing extensions on the corner elements. The corner elements are backed by the core material in the panel which is a lamination of surface elements and coring reinforcement. Each corner element can have a recess normal to the plane of the panel to receive structural support legs or the like.

3 Claims, 4 Drawing Sheets

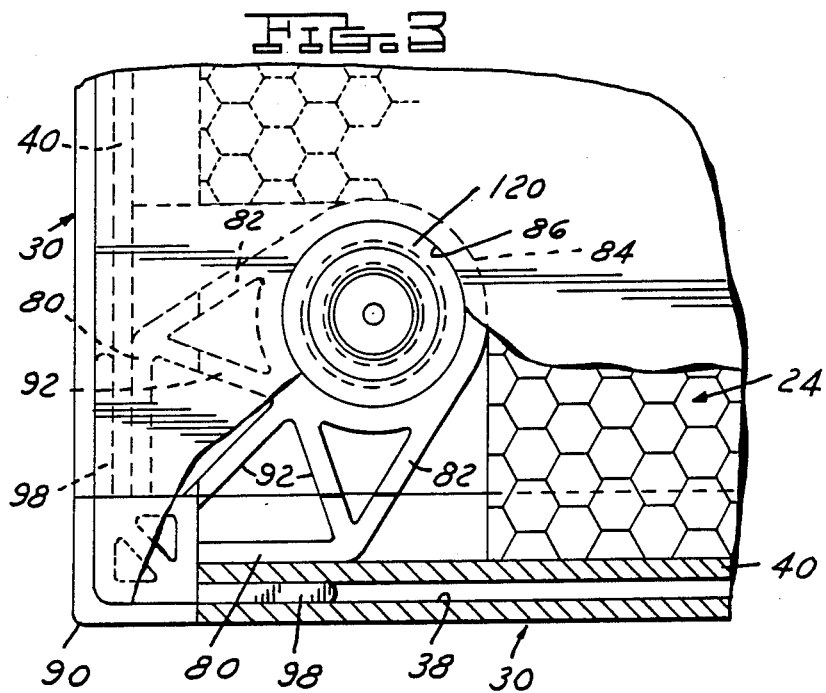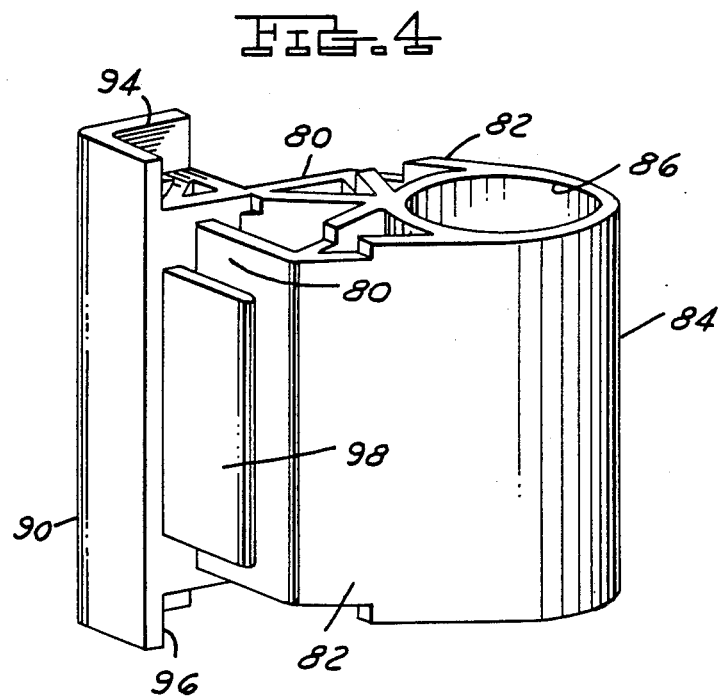

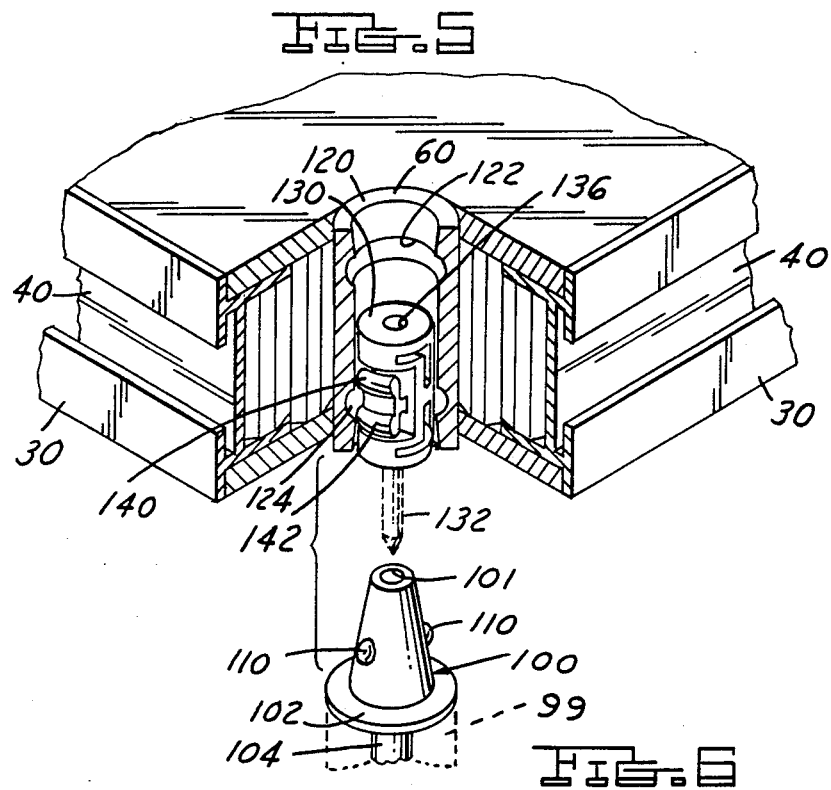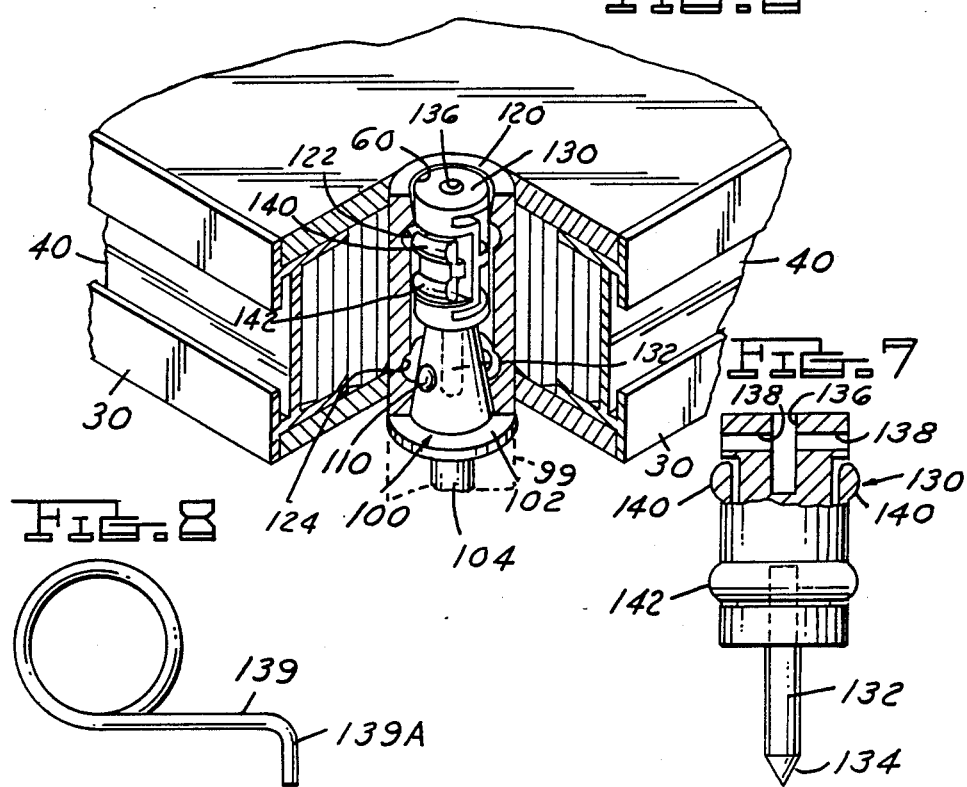

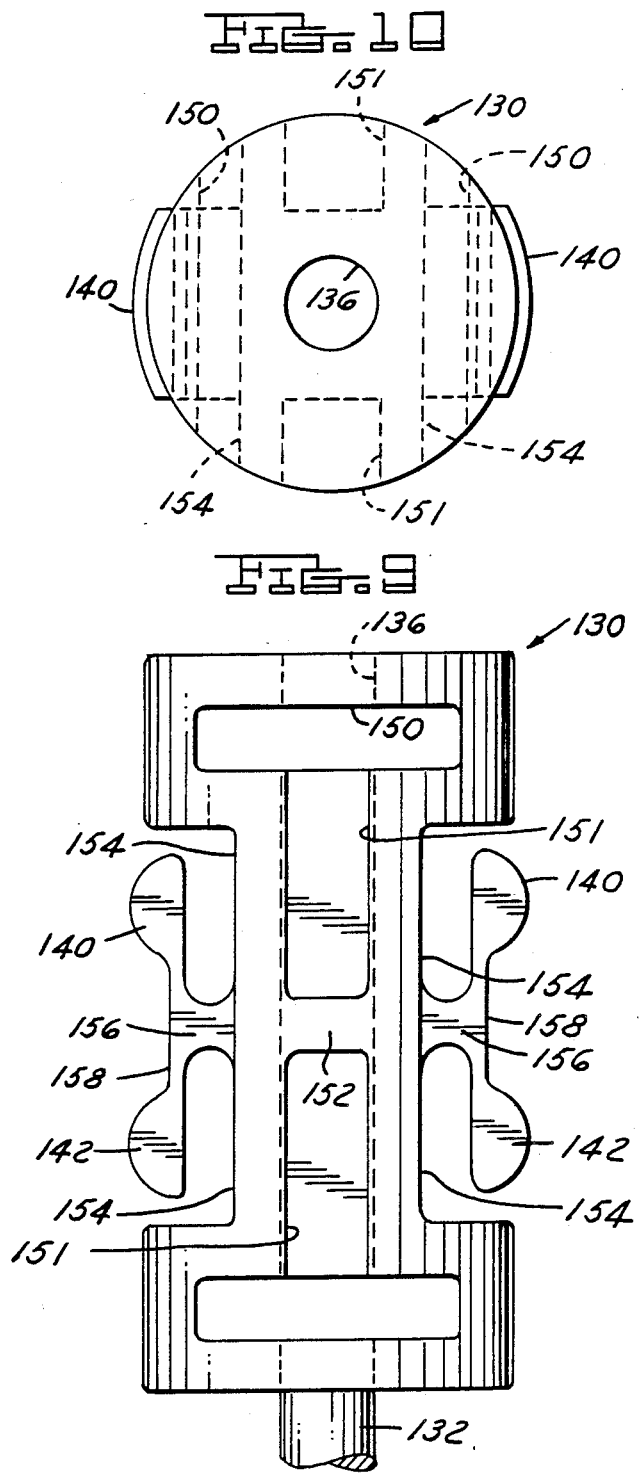

HIGH IMPACT PANEL CORNER

FIELD OF INVENTION

Panels and support legs for portable staging used for visiting musical groups and choral groups and drama presentations.

BACKGROUND AND FEATURES OF THE INVENTION

Reference is made to U.S. Pat. No. 4,638,604, issued Jan. 27, 1987, which is directed to the general subject matter of the present invention.

Portable staging is used to a considerable degree in schools, churches and public halls where space is not available for permanent stage installations for plays, choral concerts, and popular band concerts. Also portable staging is used in gymnasiums or other large halls to enlarge existing stage installations or provide raised platforms for performers.

These stage installations are composed of panels in four-by-eight feet rectangles or in square shapes with legs which are detachable so that the panels can be stored flat or readily trucked from one location to another. Very often unskilled persons, such as high school students, may be moving these panels and, accordingly, the panels are subject to rough treatment or to being dropped. Thus, the panels should have a rugged construction while being as lightweight as possible.

It is an object of the present invention to provide a portable stage panel with especially high impact corner construction since the corners of the panels are most vulnerable to damage.

Another object is the provision of a high impact corner with built-in receptacle for leg attachment and detachment.

A further object is the provision of an attachment system for support legs wherein visual inspection will assure a locked-in condition to insure safety while the panels are being used.

The attachment system includes cooperating insertion elements in a corner bore to lock the leg elements in position against accidental dislodgment while permitting easy assembly and disassembly.

Other objects and features of the invention will be apparent in the following specification and claims in which the invention is described together with details to enable persons skilled in the art to practice the invention, all in connection with the best mode presently contemplated for the invention.

BRIEF DESCRIPTION OF THE DRAWINGS

DRAWINGS accompany the disclosure, and the various views thereof may be briefly described as:

FIG. 3, a plan view of a modified corner construction partially sectioned.

FIG. 4, a perspective view of the corner insert illustrated in FIG. 3.

FIG. 5, a view of a corner socket cylinder for cooperation with a support leg.

FIG. 6, a view of the assembled leg unit and corner socket.

FIG. 7, a diagrammatic view of an operative insert for a leg unit.

FIG. 8, a view of a release pin for an operative insert.

FIG. 9, an elevation of an operative insert.

FIG. 10, an end view of the insert of FIG. 9.

DETAILED DESCRIPTION OF THE INVENTION AND THE MANNER AND PROCESS OF USING IT

Figure 1:
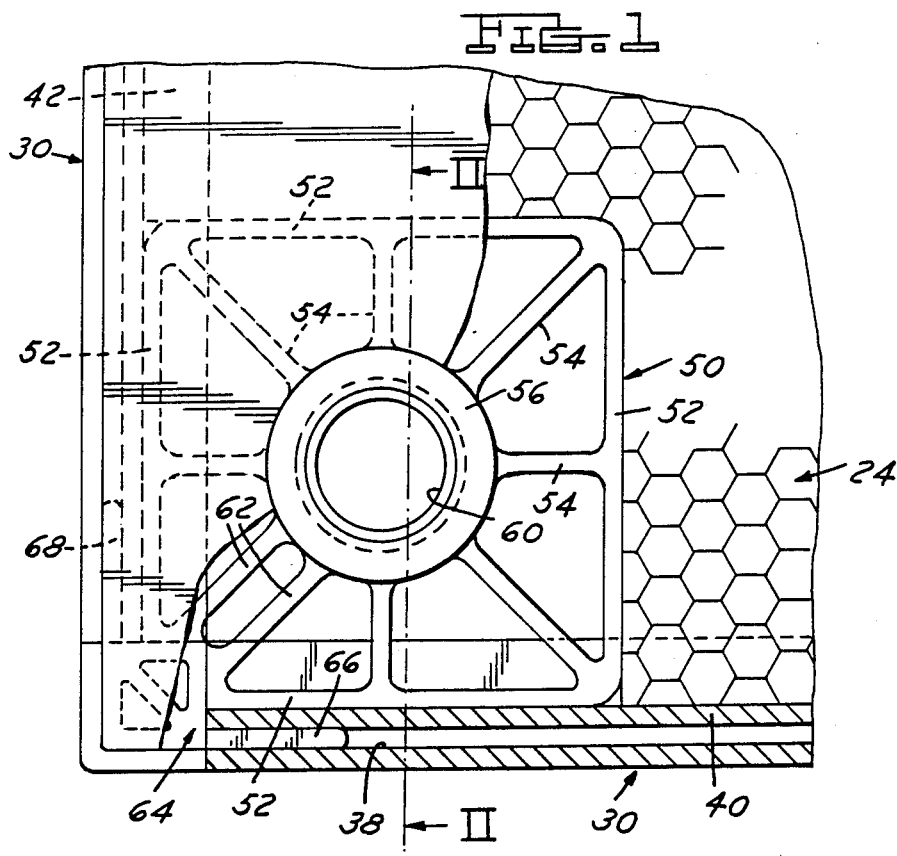
FIG. 1, a plan view partially sectioned to illustrate a first embodiment of a corner construction.
Figure 2:
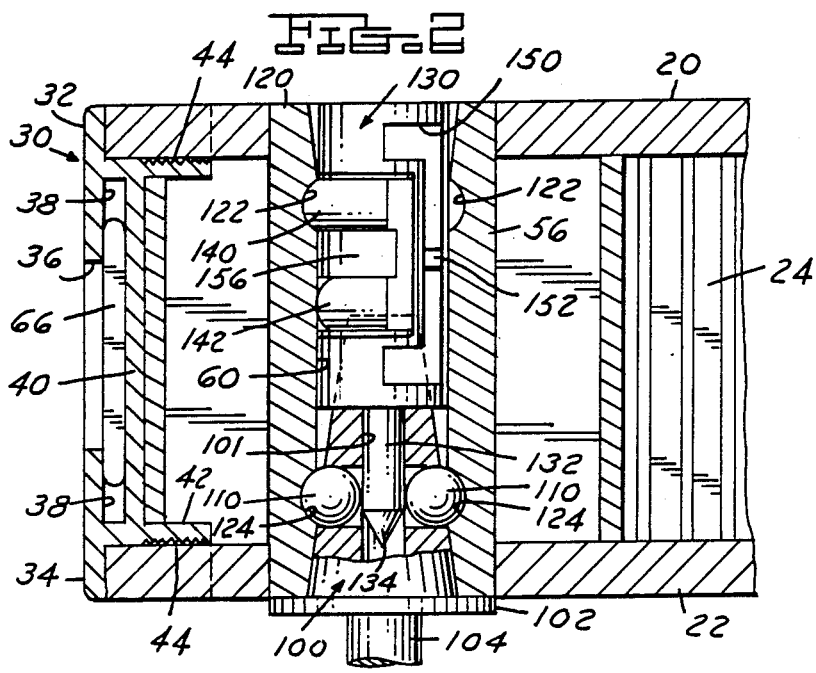
FIG. 2, a sectional view on line 2—2 of FIG. 1.

With reference first to FIGS. 1 and 2, the corner of a stage panel is illustrated in plan in FIG. 1 and in section in FIG. 2. Each panel has a top surface element 20 and a bottom surface 22 formed of a compact material and overlying and underlying a lightweight honeycomb filler 24. These surface elements and the filler are preferably bonded together as a unitary structure.

Around the edge of the panel are molded or extruded side plates 30 preferably formed of aluminum and shown in vertical section in FIG. 2. Each side plate has an outer wall surface flanged at top 32 and bottom 34 and open at 36 to provide an elongate passage which opens to a re-entrant groove 38 in front of a back wall 40. Inner flanges 42 have serrated outer surfaces 44 which cooperate in retaining the side plates in the panel construction.

The corner construction in FIG. 1 includes a square aluminum or plastic molding or extrusion block 50 which has sides 52 connected by webs 54 to a cylindrical wall 56 which has an axial recess 60.

At the corner of the block 50 where the two side plates converge are parallel webs 62 which are integral with converging sides 52 and with an outer corner pillar 64, which has top and bottom ends which are flush with the outer surfaces of the top and bottom surface elements 20, 22. These surface elements overlie the remainder of the block 50, that is, the sides 52 and webs 54, 62. The pillar 64 has wing tabs 66 and 68 shaped and dimensioned to enter the re-entrant groove 38,38 so the corner block is securely established as an integral part of the panel, locked into the two side extruded plates 30 and between the top and bottom surface elements 20 and 22.

Thus, any corner impact on the panel will be resisted by the block 50 and the pillar 64 which are solidly mounted between the top and bottom surfaces 20, 21 and the side plates 30.

In FIGS. 3 and 4, a modified impact corner is illustrated. Reference characters applied to FIGS. 1 and 2 are applied to similar parts in FIGS. 3 and 4. The corner insert is, in this case, shaped like a trapezium with two forward walls 80 at right angles to each other and two rearwardly extending walls 82 merging in a rounded surface 84 inside of which is a cylindrical opening 86. The corner pillar 90 is formed at the juncture of walls 80, and webs 92 reinforce the entire structure. The pillar 90 extends above and below the general plane of the insert at 94 and 96. Side wings 98 cooperate with the reentrant grooves 38 in the panel side plates 30.

The high impact corners illustrated in FIGS. 1 to 4 also serve to support the panels at the corners. As illustrated in FIGS. 5 and 6, a support leg 99 will be securely attached to a flanged conical projection 100 having a central bore 101 and a bottom flange 102 and also a depending shaft 104 which is embedded in the support leg. The support legs may have a series of two or four spaced projections to engage adjacent panels in an extended stage array. Each conical projection 100 has recessed opposed detent balls 110 to cooperate with a receiving socket 120 having a cylindrical bore 60. This socket can either be cast into the impact corner as in FIGS. 1 and 2 or inserted and retained in the cylindrical recess 86 of FIGS. 3 and 4.

The receiving socket bore 60 has two axially spaced, annular grooves 122 and 124. As shown in FIG. 7, a top plug insert 130 shown diagrammatically is generally cylindrical in shape and has embedded in the lower end a metal pin 132 with a tapered end 134. The top of the insert has a central hole 136 and side bores 138.

In FIG. 8, a looped hook tool 139 has a toe portion 139A which can be inserted in hole 136 and a bore 138 to lift the insert 130.

Referring again to FIG. 7, there are resilient projections 140 and 142 on the outer surface of insert 130 which will provide an interference fit in the socket bore 60. These projections will engage the upper groove 122 to position and retain the insert in the bore when the panel is not in an operative position.

In FIG. 9, an elevation of an actual operative insert 130 is shown. The insert is basically cylindrical and has a steel pin 132 mounted centrally in one end. The opposite end has a central opening 136 to receive the toe end 139A of retraction tool 139 (FIG. 8). An oblong passage 150 extends through the insert intersecting the central hole 136. This passage accommodates the toe 139A of the tool 139 to allow lifting of the insert. Elongate side openings 151, FIGS. 9 and 10, separated by a web 152, are non-functional but provided to lighten the insert and save material. As viewed in FIG. 9, there are opposed, axially spaced, chordal cored openings 154 separated by webs 156. Extending axially from each of these webs 156 are chordal projections 140 and 142 connected to the webs 154 by resilient neck portions 158. The projections 140, 142 are rounded in both the axial and transverse dimension (FIGS. 9 and 10) to cooperate with annular grooves 122 and 124 in the socket recess 60 of socket 120.

IN THE OPERATION of the described structure, in the storage position of a panel, the plug insert 130 can be in the upper position as shown in FIG. 6 where projections 140 engage groove 122. In this position the insert is retained against dislodgment and protected from accidental contact. The depending pin 132 is confined in the lower portion of the recess 60. If desired, the insert 130 can be moved to the lower position prior to assembly to facilitate insertion of the pin 132 into the opening 101 in cone 100.

When a support leg core 100 is projected into recess 60, the pin 132 will enter the central bore 101 of the core and position near the detent balls 110. The conical end 134 of pin 132 is intended to cam the balls 110 outward into the annular groove 124 in bore 60. If this camming is not immediate, the top insert 130 will be forced up out of bore 60 a short distance to project above the surface 20 of the panel. This will alert an assembler that the pin 132 is not seated and he or she can step on the insert 130 to force the conical point 134 between the balls 110 to lock the leg in the socket 60. In this position the projections 140 of the insert will engage the upper groove 122 and both the cone 100 and the insert 130 are locked in position in the bore recess 60.

To release a leg from a panel corner, the tool 139 (FIG. 8) is used. The toe 139A of the tool is inserted into the passage 136 and hooked into a bore 138 (FIG. 7) or a recess 150 (FIG. 9). An upward force on the tool 139 pulls the insert 130 up, removing the pin 132 from between the detent balls 110. This permits the release of the cone 100 from the lower end of the bore 60. In this position, the detent projections 142 on the insert 130 can engage the upper groove 122 to retain the insert in place. After the removal of the support leg, the insert may again be pressed flush with the panel top, thus engaging detent projections 140 with upper groove 122 so the insert is secured against dislodgment during the transportation or storage phase.

In addition to support legs, the attachment structure above described may be used to connect railing stanchions and other elements of a staging system.

It will be appreciated that the projection 132 not only actuates the detents 110 but also serves as a stabilizing element in being received in the central recess of the leg cone 100. Together, the cone 100 and the insert 130 are joined in a combined unit filling the bore 60 and resisting any lateral movement of the support leg or other element secured to the cone 100. In some embodiments, the projection pin 132 can be eliminated and locking will be inherent in the detent projections 140, 142, for example, as shown in FIGS. 9 and 10.

What is claimed is:

1. In a staging system for construction of flat stages, choral risers, and the like,
   (a) a flat structural load-bearing panel to serve as a module having upper and lower surface plates with exposed edges,
   (b) edge plates secured to edges of said panel, each edge plate having ends extending toward corners of said panels and having a groove open at the ends of said edge plates, said groove extending parallel to said panel surface plates,
   (c) a high impact corner element recessed into said panel at each corner and flanked by said edge plates comprising a block located within and having two conjuctive sides covered by said edge plates, and
   (d) laterally extending wings on said block external of said conjuctive sides positioned to be received and retained in respective grooves of adjacent edge plates,
   whereby said corner elements are locked into engagement with said edge plates and said panel,
   said edge plates extending over the exposed edges of said surface plates, said wings terminating a short distance from a corner of said panel, said corner element being located between and covered by said surface plates, and having an external pillar positioned between spaced ends of said edge plates lying perpendicular to said laod-bearing panel, the ends of the pillar being flush with the upper and lower surface plates of said panel, said wings extending from said pillar into said respective grooves.

2. In a staging system for construction of flat stages, choral risers, and the like,
   (a) a flat structural load-bearing panel to serve as a module having upper and lower surface plates,
   (b) edge plates secured to edges of said panel, each edge plate having ends extending toward corners of said panels and having a groove open at the ends of said edge plates, said groove extending parallel to said panel surface plates,
   (c) a high impact corner element recessed into said panel at each corner and flanked by said edge plates comprising a block located within and having two conjuctive sides covered by said edge plates, and
   (d) laterally extending wings on said block external of said conjuctive sides positioned to be received and retained in respective grooves of adjacent edge plates, whereby said corner elements are locked into engagement with said edge plates and said panel, said corner element being a square block of molded plastic having a central recess with an axis perpendicular to the plane of said panel to serve to mount a supporting leg.

3. In a staging system for construction of flat stages, choral risers, and the like,
(a) a flat structural load-bearing panel to serve as a module having upper and lower surface plates,
(b) edge plates secured to edges of said panel, each edge plate having ends extending toward corners of said panels and having a groove open at the ends of said edge plates, said groove extending parallel to said panel surface plates,
(c) a high impact corner element recessed into said panel at each corner and flanked by said edge plates comprising a block located within and having two conjunctive sides covered by said edge plates, and
(d) laterally extending wings on said block external of said conjunctive sides positioned to be received and retained in respective grooves of adjacent edge plates, whereby said corner elements are locked into engagement with said edge plates and said panel, said corner element having a trapezium shape with a first two sides conjunctive at a corner, and a second two sides angled to said first two sides and to each other terminating in a substantially semi-circular wall, and a central recess formed in said corner element with an axis perpendicular to the plane of said panel to serve to mount a supporting leg.

* * * * *